US011470863B2

United States Patent
Ditzler

(10) Patent No.: US 11,470,863 B2
(45) Date of Patent: Oct. 18, 2022

(54) HIGH HUMIDITY OZONE GAS TREATMENT

(71) Applicant: Lee C. Ditzler, Livermore, CA (US)

(72) Inventor: Lee C. Ditzler, Livermore, CA (US)

(*) Notice: Subject to any disclaimer, the term of this patent is extended or adjusted under 35 U.S.C. 154(b) by 300 days.

(21) Appl. No.: 16/840,325

(22) Filed: Apr. 4, 2020

(65) Prior Publication Data

US 2021/0030030 A1 Feb. 4, 2021

Related U.S. Application Data

(62) Division of application No. 15/640,227, filed on Jun. 30, 2017, now Pat. No. 10,609,941.

(51) Int. Cl.

| | |
|---|---|
| ***A61L 2/00*** | (2006.01) |
| ***A61L 9/00*** | (2006.01) |
| ***A23L 3/3445*** | (2006.01) |
| ***A23B 7/152*** | (2006.01) |
| ***A23L 3/00*** | (2006.01) |

(52) U.S. Cl.

CPC ............ *A23L 3/3445* (2013.01); *A23B 7/152* (2013.01); *A23L 3/001* (2013.01); *A23L 3/003* (2013.01); *A23V 2002/00* (2013.01)

(58) Field of Classification Search

CPC ........ A61L 2/0082; A61L 2/0094; A61L 2/20; A61L 2/202; A61L 2/22; A61L 9/015; A61L 9/14; A61L 2209/212; A61L 3/001; A23B 7/152

USPC ...... 422/28, 34; 261/81, 104, 30–32, 45, 75, 261/DIG. 17, DIG. 42, DIG. 85, 79.1

See application file for complete search history.

(56) References Cited

U.S. PATENT DOCUMENTS

2007/0274858 A1* 11/2007 Childers ................ A61L 2/208 422/62
2012/0219456 A1* 8/2012 Childers ................ A61L 2/208 422/547

* cited by examiner

*Primary Examiner* — Monzer R Chorbaji
(74) *Attorney, Agent, or Firm* — West & Associates, A PC; Stuart J. West; Charlotte Rodeen-Dickert

(57) ABSTRACT

Systems and methods for providing high humidity ozone gas. Systems and methods for applying high humidity ozone gas to foodstuffs and/or other products as an antimicrobial treatment. Compressed air and dry ozone gas are combined, thereby providing a dry mix. A portion of the dry mix can be humidified in a humidifying chamber, thereby providing a wet mix. The wet mix can be combined with a portion of the dry mix, thereby providing humid ozonated air. The humid ozonated air can be applied to foodstuffs such as produce, as an antimicrobial treatment, as the foodstuffs are conveyed.

7 Claims, 8 Drawing Sheets

HIGH HUMIDITY OZONE GAS TREATMENT

CROSS-REFERENCE TO RELATED APPLICATIONS

This application is a Divisional Patent Application of prior-filed and co-pending U.S. patent application Ser. No. 15/640,227, filed Jun. 30, 2017, now U.S. Pat. No. 10,609, 941 the complete contents of which is hereby concorporated herein.

TECHNICAL FIELD

The present disclosure relates to providing a preparation of ozone gas, and antimicrobial treatment of foodstuffs and equipment

BACKGROUND

Foodstuffs such as fresh produce are subject to spoilage by the action of unwanted microbes such as molds and bacteria. Some examples of such produce are lemons, blueberries, kiwi fruit, apples, strawberries, nuts, and, grapes. Microbes are present on the produce prior to harvesting, and remain with produce as it moves from the field into processing facilities. In order to minimize damage to the harvested produce from the microbes, processors typically take steps that can include some or all of chemical fungicide treatment, liquid wash, and, cold storage for the produce. Each of these steps potentially provides potential remedial benefits, but each also has problematic aspects.

After harvesting, many produce types can be treated with chemical fungicides and/or bactericides in an attempt to inhibit microbe growth. Even after such treatment, microbe growth can cause damage, particularly as storage time is increased. Residual mold can continue to grow and can develop into large nesting molds. Fungicide treatment can be relatively expensive, due at least in part to the cost of the fungicides. Allergies to fungicides are common, and can adversely affect produce workers, other workers who have direct or indirect contact with the products, and eventual consumers of the products. Products treated with some chemical fungicides and/or bactericides are ineligible for designation and/or description as organic produce, and thus lose access to significant markets.

After harvesting, produce can be washed with a sanitizing liquid in order to remove dirt and other unwanted substances. The sanitizing liquid can be water mixed with various sanitizing agents. However, the shapes of many produce items contain crevices that are not effectively cleaned by this technique. Items can have irregular surfaces and numerous cavities and crevices. Surface tension of a sanitizing liquid such as water can prevent liquid from reaching into small cavities and crevices, thus adequate cleaning action cannot occur in those locations. Unwanted substances and microbes can remain undisturbed.

The reduced temperature environment of cold storage can inhibit microbial growth. However, cold storage is typically implemented at high humidity levels in order to prevent damaging the produce by dehydration. At typical high humidity cold storage levels such as 50% to 90% relative humidity, molds can be active. In such conditions, microbes such as molds can live, grow, and propagate, such as by sporulation. In order to maintain uniform temperature, air within cold storage units is typically continuously refrigerated and circulated, providing an ideal mechanism for spreading airborne spores throughout an entire refrigerated unit. The living and propagating microbes can significantly damage produce inventory within the storage unit.

In addition to molds, bacteria such as *E. coli, Listeria* and *Salmonella* can cause damage to fresh produce, and to dry products such as powders, flakes and seeds. Damage to fresh produce and dry products can take place in contained environments such as hoppers, silos, augers, pipelines, and various enclosures.

Thus what is needed are improved systems and methods for eliminating microbes on foodstuffs including fresh produce, stored fresh produce, and dry products, with particular attention to contained environments.

Attempts have been made to utilize ozone gas across a range of temperatures, such as −40 F. to −100 F., as an anti-microbial agent. When the gas is taken directly from an ozone generator, it has little effect at reducing bacteria and mold spores. Typical ozone generators produce ozone gas at 0.2% to 10% ozone by weight , corresponding respectively to 2,000 to 100,000 ppm. The ozone gas produced is typically kept extremely dry (−40 to −100° F. dew point) in order to eliminate undesirable moisture in the ozone generating cell. Moisture passing through an ozone generating cell produces nitric acid that can cause severe damage to the cell and downstream equipment.

Many mold spores and spore forming microbes can tolerate high levels of dry ozone gas without being killed. However, water with ozone dissolved at levels between 0.2 and 10 ppm can be an effective killer of bacteria and mold spores that are planktonic, in very short times.

Thus what is needed are systems and methods increase the microbe-reducing effectiveness of ozone gas application to fresh produce, stored fresh produce, and dry products, with particular attention to contained environments.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including the steps of: combining compressed air and dry ozone gas, thereby forming a dry mix; splitting the dry mix, thereby forming a chamber dry mix source and a bypass dry mix source; humidifying the chamber dry mix source, thereby providing a wet mix; combining the wet mix and the bypass dry mix source, thereby forming humid ozonated air; and, applying the humid ozonated air to produce, thereby providing an antimicrobial treatment to the produce. Other embodiments of this aspect include corresponding computer systems, apparatus, and computer programs recorded on one or more computer storage devices, each configured to perform the actions of the methods.

Implementations may include one or more of the following features. The method further including the steps of: providing a chamber; receiving the chamber dry mix source into the chamber; misting water within the chamber; removing excess water from the chamber by cycloning; removing excess water from the chamber by coalescing; and, providing the wet mix from the chamber. The method further including the steps of: providing an ozone generator configured to generate ozone gas; monitoring ozone concentration of the dry mix, thereby providing an ozone level measurement; and, generating the dry ozone gas responsive to the ozone level measurement. The method further including the steps of: monitoring humidity level of the humid ozonated air, thereby providing a humidity measurement; providing a blending valve, configured to selectively split the dry mix into the chamber dry mix source and the bypass dry mix source; and, selectively splitting the dry mix into the chamber dry mix source and the bypass dry mix source, responsive to the humidity measurement. The method further including the steps of: conveying the produce on a wire conveyor, where the humid ozonated air is applied by nozzles to the produce as the produce is conveyed. The method further including the steps of: providing a vibrating sloped channel including a terminal edge; and, conveying the produce on the vibrating sloped channel past the terminal edge, thereby providing a cascade of produce; where the humid ozonated air is applied by nozzles to the cascade of produce. The method further including the steps of: seiving the produce, thereby providing a cascade of produce; where the humid ozonated air is applied by nozzles to the cascade of produce. The system further including: an input junction coupled with the blending valve and configured to receive compressed air and dry ozone gas, and, provide the dry mix from the compressed air and dry ozone gas; an air compressor coupled with the input junction and configured to provide the compressed air; and, an ozone generator coupled with input junction and configured to provide the dry ozone gas. The system further including: an ozone monitor coupled with the blending valve and configured to provide an ozone level measurement corresponding to the dry mix, where the ozone generator is configured to provide the dry ozone gas responsive to the ozone level measurement. The system further including: a humidity monitor coupled with the output junction and configured to provide a humidity measurement corresponding to the humid ozonated air, where the blending valve is further configured to selectively provide the chamber dry mix source and the bypass dry mix source responsive to the humidity measurement. The system further including: a treatment enclosure; a wire conveyor within the treatment enclosure and configured to convey produce; and, a plurality of nozzles within the treatment enclosure and configured to apply the humid ozonated air to produce as the produce is conveyed on the wire conveyor, thereby providing an antimicrobial treatment. The system further including: a treatment enclosure; a vibrating sloped channel within the treatment enclosure including a terminal edge and configured to convey produce in the channel and beyond the terminal edge, thereby providing a cascade of produce; and, a plurality of nozzles within the treatment enclosure and configured to apply the humid ozonated air to the cascade of produce, thereby providing an antimicrobial treatment. The system further including: a treatment enclosure; a seive within the treatment enclosure configured to seive produce, thereby providing a cascade of produce; and, a plurality of nozzles within the treatment enclosure and configured to apply the humid ozonated air to the cascade of produce, thereby providing an antimicrobial treatment. Implementations of the described techniques may include hardware, a method or process, or computer software on a computer-accessible medium.

One general aspect includes a system for providing humid ozonated air including: a chamber including within its volume misting nozzles, spinner plates, and a coalescing unit, and configured to receive a chamber dry mix source and to provide a wet mix; a blending valve coupled with the chamber and configured to receive a dry mix, and, selectively provide the chamber dry mix source and a bypass dry mix source from the dry mix; an output junction coupled with the chamber and the blending valve, and configured to combine the bypass dry mix source and the wet mix, thereby providing humid ozonated air; where the misting nozzles are configured to deliver water mist into the chamber; where the spinner plates are configured to remove by cyclonic action liquid water from the chamber; where the coalescing unit is configured to remove by a coalescing process liquid water from the chamber; and, where the wet mix is responsive to the chamber dry mix source and the water mist. Other embodiments of this aspect include corresponding computer systems, apparatus, and computer programs recorded on one or more computer storage devices, each configured to perform the actions of the methods.

Implementations may include one or more of the following features. The system further including: an input junction coupled with the blending valve and configured to receive compressed air and dry ozone gas, and, provide the dry mix from the compressed air and dry ozone gas; an air compressor coupled with the input junction and configured to provide the compressed air; and, an ozone generator coupled with input junction and configured to provide the dry ozone gas. The system further including: an ozone monitor coupled with the blending valve and configured to provide an ozone level measurement corresponding to the dry mix, where the ozone generator is configured to provide the dry ozone gas responsive to the ozone level measurement. The system further including: a humidity monitor coupled with the output junction and configured to provide a humidity measurement corresponding to the humid ozonated air, where the blending valve is further configured to selectively provide the chamber dry mix source and the bypass dry mix source responsive to the humidity measurement. The system further including: a treatment enclosure; a wire conveyor within the treatment enclosure and configured to convey produce; and, a plurality of nozzles within the treatment enclosure and configured to apply the humid ozonated air to produce as the produce is conveyed on the wire conveyor, thereby providing an antimicrobial treatment. The system further including: a treatment enclosure; a vibrating sloped channel within the treatment enclosure including a terminal edge and configured to convey produce in the channel and beyond the terminal edge, thereby providing a cascade of produce; and, a plurality of nozzles within the treatment enclosure and configured to apply the humid ozonated air to the cascade of produce, thereby providing an antimicrobial treatment. The system further including: a treatment enclosure; a seive within the treatment enclosure configured to seive produce, thereby providing a cascade of produce; and, a plurality of nozzles within the treatment enclosure and configured to apply the humid ozonated air to the cascade of produce, thereby providing an antimicrobial treatment. Implementations of the described techniques may include hardware, a method or process, or computer software on a computer-accessible medium.

DETAILED DESCRIPTION

Figure 1:
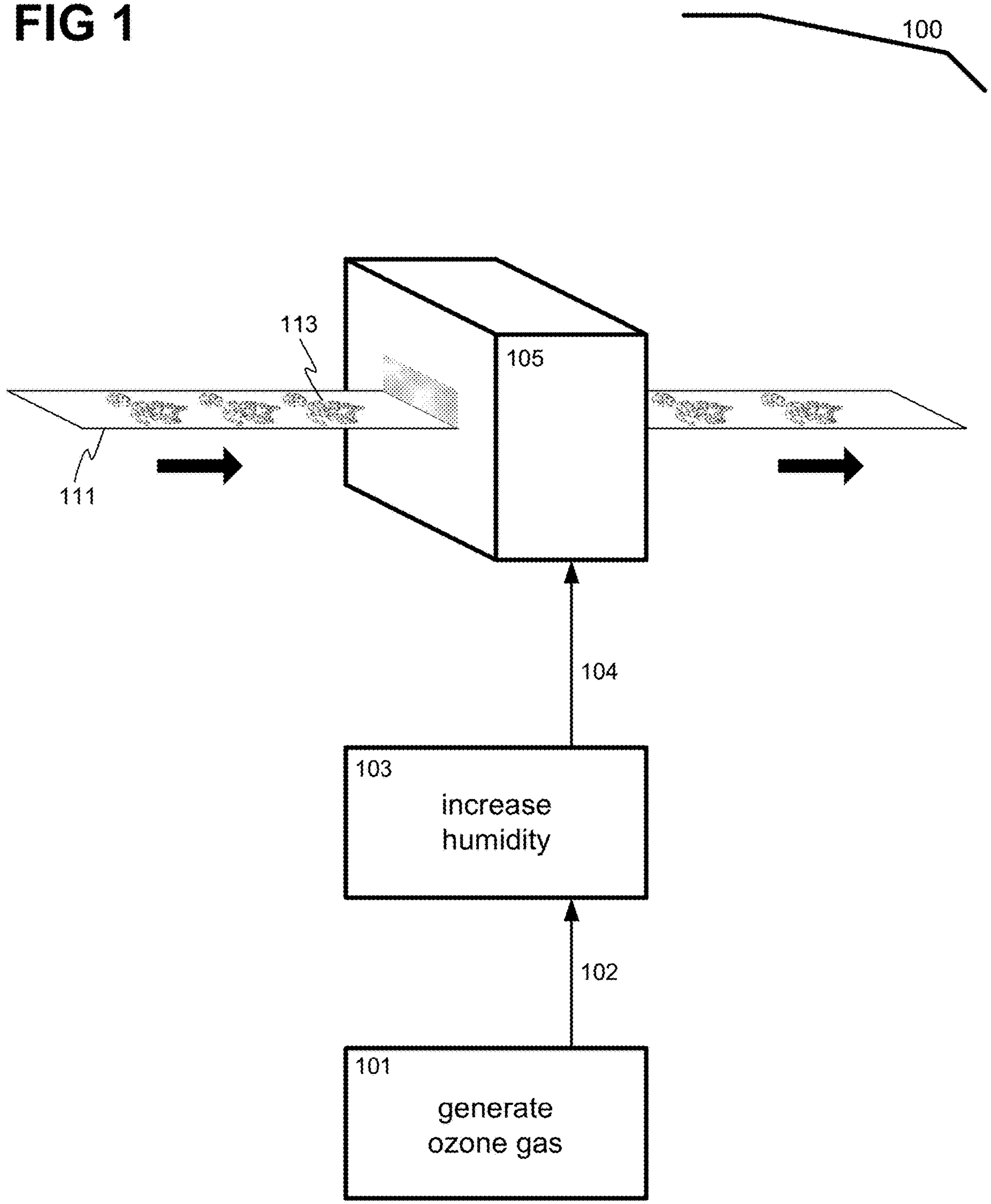
FIG. 1 depicts a high humidity ozone gas treatment system.
Figure 2A:
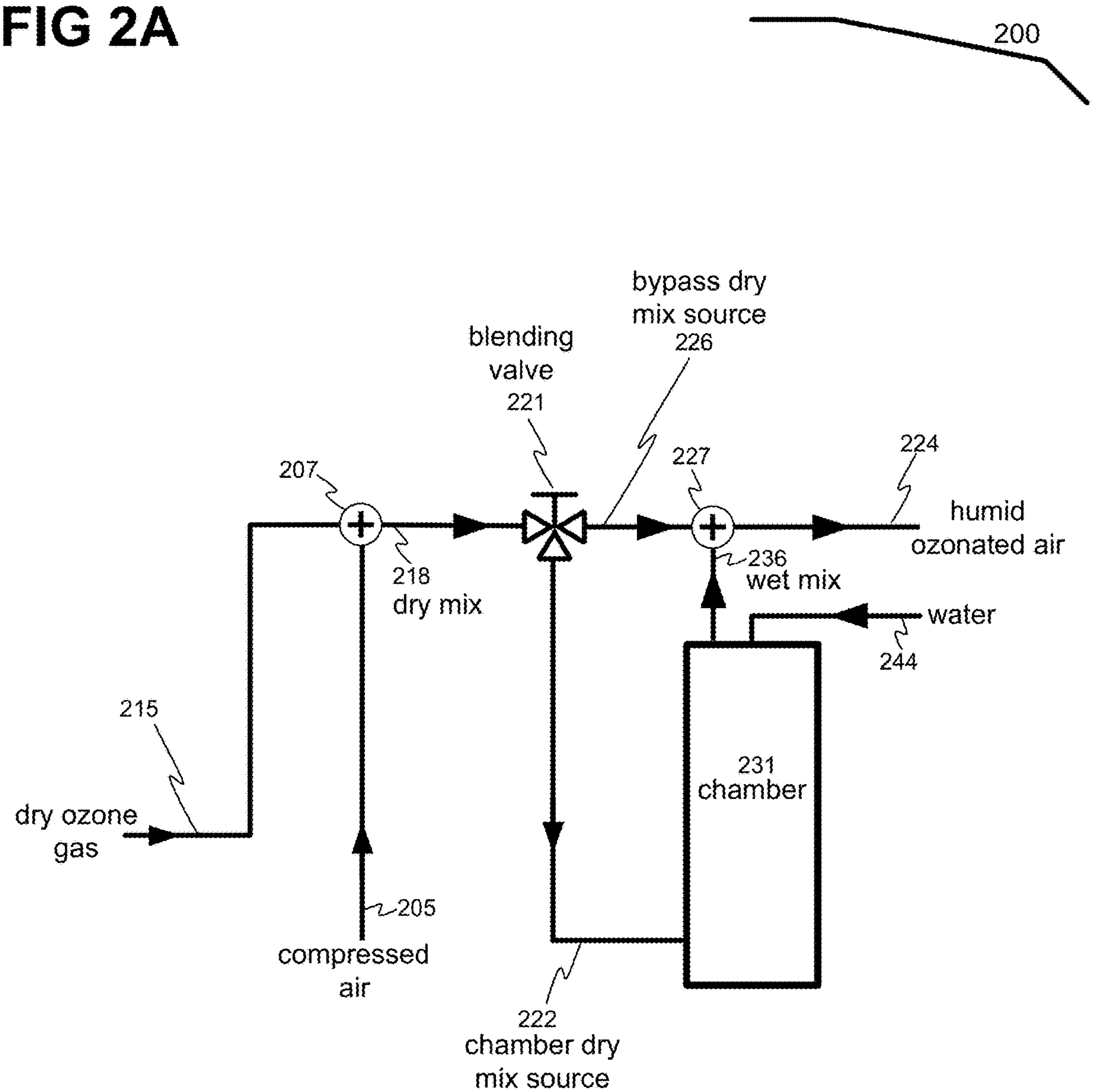
FIG. 2A depicts a system embodiment for providing humid ozonated air.
Figure 2B:
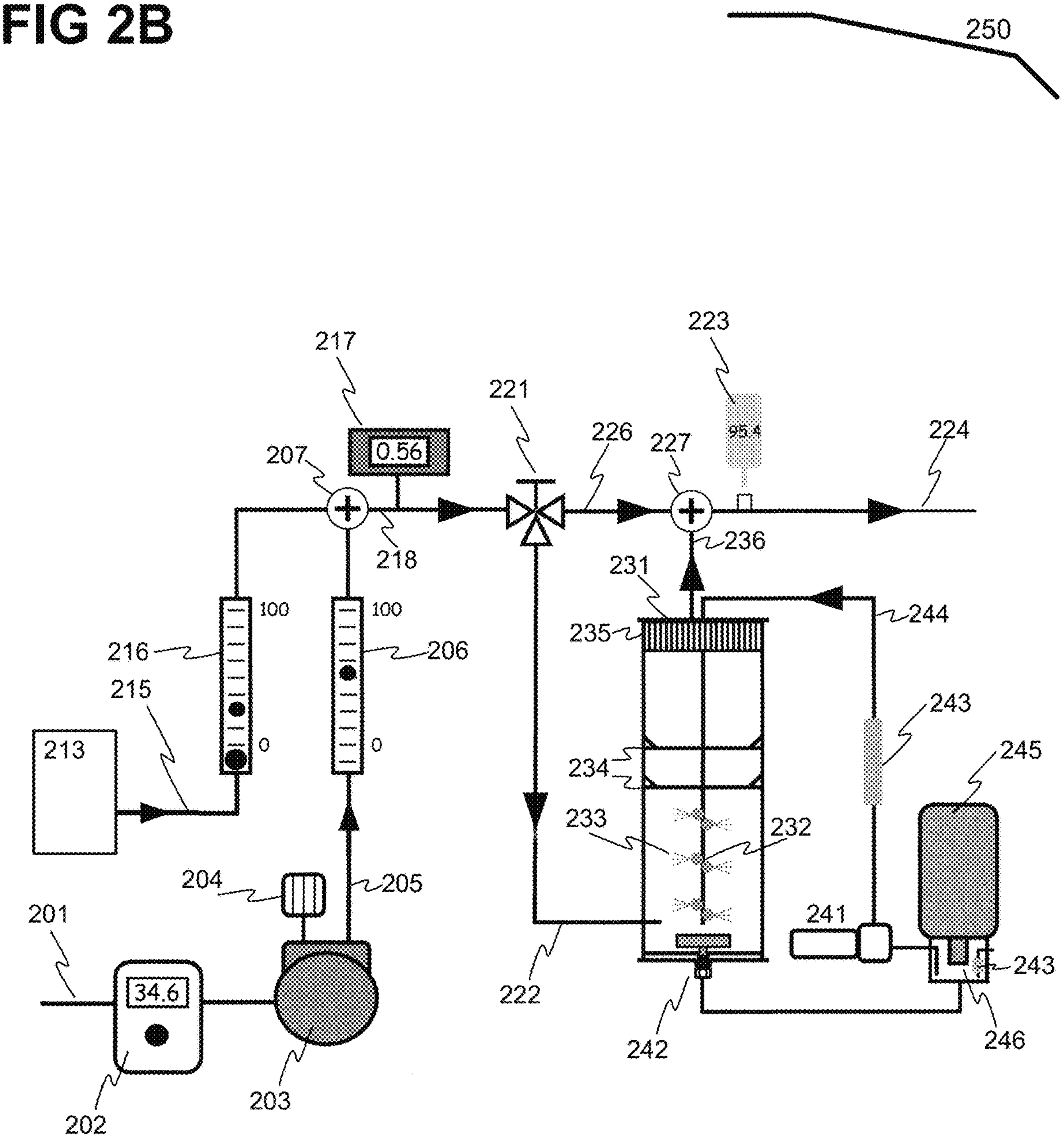
FIG. 2B depicts a detailed system embodiment for providing humid ozonated air.

Diagram 100 depicts a high humidity ozone gas treatment system. A typical ozone gas generator 101 can generate ozone gas 102 that is extremely dry. The dry ozone gas 102 can be input to a process 103 that provides humid ozonated air 104. The process 103 can combine the dry ozone gas 102, air, and water to provide the humid ozonated air 104. In typical embodiments the dry ozone gas 102 can have a dew point in the range of −40 F to −100 F. The humid ozonated air 104 can have substantially higher moisture content at operating temperatures, with relative humidity in the range of 40% to 98%, and a typical operating level greater than 90% within that range and non-condensing. Some typical operating temperatures can range from approximately 32 F. corresponding to a typical cold storage facility to approximately 70 F. corresponding to a typical room temperature.

A conveying system 111 can convey foodstuffs 113 through a treatment enclosure 105. Within the treatment enclosure 105, the humid ozonated air 104 can be applied to the foodstuffs as an antimicrobial treatment. Ozone levels of the humid ozonated air 104 can be in the range of 100 ppm to 100,000 ppm for some treatments, with a level of 5000 ppm corresponding to some typical embodiments. Corresponding to various embodiments, duration of exposure to the humid ozonated air 104 for a treatment can range from a few seconds to many minutes. In some typical embodiments, the duration of exposure can be within a range of 30 to 120 seconds.

Exposure to humid ozonated air can cause microbe spores to open and thereby become susceptible to effective antimicrobial action of the ozone. The searching effect of humid ozonated air application can advantageously treat irregular surfaces, cavities, and crevices found on foodstuffs that cannot be effectively reached by liquid treatments. Humid ozonated air can also be effectively applied to products such as dry powders, flakes, and seeds for which liquid treatments are undesirable.

Diagram 200 depicts a relatively simplified system embodiment for providing humid ozonated air. Diagram 250 depicts an embodiment for providing humid ozonated air 224 comprising common elements with the system of diagram 200 and further comprising additional elements and detail. In reference to diagrams 200 and 250, dry ozone gas 215 and compressed air 205 can be combined by input junction 207, thereby providing a gaseous dry mix 218 of air and ozone gas. The dry mix 218 can be selectively split by blending valve 221 into a bypass dry mix source 226 and a chamber dry mix source 222. A humidifying chamber 231 can receive and process the chamber dry mix source 222 and water 244, thereby producing a gaseous wet mix 236. Wet mix 236 and bypass dry mix source 227 can be combined by output junction 227, thereby providing humid ozonated air 224. Blending valve 221 can control the absolute and/or relative amounts of the chamber dry mix source 222 and the bypass dry mix source 226, thereby providing adjustment of the humidity in the humid ozonated air 224 provided by output junction 227.

Some embodiments can provide a flow of humid ozonated air 224 within a range of 0.1 cfm to 50 cfm. In some typical embodiments, the flow can be in the range of 0.5 cfm to 10 cfm. In some embodiments the humidity level of the humid ozonated air 224 can be in the range of 30% to 99%. In some typical embodiments, the humidity level can be in the range of 90% to 98%. In some embodiments the ozone level of the humid ozonated air 224 can be within a range of 25 ppm to 50000 ppm. In some typical embodiments the ozone level of the humid ozonated air 224 can be within a range of 200 ppm to 5000 ppm.

A compressed air flow meter 206 can indicate the flow of compressed air 205. A dry ozone gas flow meter 216 can indicate the flow of dry ozone gas 216. These flow meters 205 216 can be utilized to adjust the air to ozone ratio, that is, the ozone concentration in the dry mix 218 and hence the ozone concentration in the humid ozonated air 224.

An ozone monitor 217 can provide measurements of ozone level of the dry mix 218 gas. In some embodiments ozone monitor 217 can provide one or more signals responsive to a measurement. In some embodiments such signals can indicate measured ozone level and/or a difference between measured and desired ozone level . Such signals can be utilized in feedback and/or control of ozone generator 213. The ozone generator 213 can vary a specific amount and/or rate of dry ozone gas output 215 in response to the signal or signals, and thereby support automatic dosage control.

Chamber dry mix source 222 can enter the chamber 231 near the bottom of the chamber. One or more misting nozzles 232 can deliver water mist 233 into chamber 231. The water mist 233 can vaporize within the chamber 231, thereby increasing the humidity of gas within the chamber.

Water droplets can be present in the volume of the chamber 231. These droplets can result from incomplete vaporization of the water mist 233. A plurality of spinner plates 234 can provide a cycloning action that can remove water droplets from the volume of the chamber; that water can fall to the bottom of the chamber. Coalescing unit 235 can provide a coalescing process that can remove water droplets from the volume of the chamber. The water so removed can fall to the bottom of the chamber. A coalescing unit 235 can employ electrostatic coalescing, mechanical coalescing, and/or any other known and/or convenient coalescing method.

Wet mix 236 gas can retain ozone content of the chamber dry mix source 222, be humidified by the vaporization of the water mist 233, and cleansed of unevaporated water droplets by the cycloning action of the spinner plates 234 and the coalescing action of the coalescing unit 235.

Embodiments are herein described in which the chamber dry source mix 222 enters at the bottom of the chamber 231. Having entered at the bottom of the tank, gas can move up through a volume of the tank having misting nozzles 232 and delivering water mist 233, then move further up through successive volumes of the tank that have spinner plates 234 and then a coalescing unit 235, eventually providing humidified gas as wet mix 236 from the highest point within the tank 231. However, many possible embodiments are not so limited as to the placement and relative positioning of these elements. In a variety of embodiments, the absolute and/or relative positioning of the entry of chamber dry source mix 222, misting nozzles 232 and hence water mist 233, spinner plates 234, and exit of wet mix 236 can vary.

A humidity monitor 223 can provide measurements of the humidity level of the humid ozonated air 224. In some embodiments humidity monitor 223 can provide one or more signals responsive to a measurement. In some embodiments such signals can indicate measured humidity level and/or a difference between measured and desired humidity level. Such signals can be utilized in feedback and/or control of blending valve 221. Blending valve 221 can control the absolute and/or relative amounts of the chamber dry mix source 222 and the bypass dry mix source 226 responsive to the signals, thereby providing adjustment of the humidity in the humid ozonated air 224 provided by output junction 227.

Some embodiments comprise a recirculating system for delivering water 244 to the misting nozzles 232. A water tank 245 can supply a reservoir 246 for the system and can be sized conveniently for operation and maintenance, such as by way of example and not limitation, a 5 gallon tank. A pump 241 can draw water from the reservoir 246 and pressurize the water feed 244 to the mister nozzles 232. In some embodiments, the pump 241 can provide pressures within a range of 30 to 100 psi. An undesirable build up of minerals within the system can be minimized by supplying the reservoir 246 with distilled water. Minerals and/or other undesirable items such as debris within the system can be avoided by utilizing a filter 243 in line with the water feed 244. Unevaporated water such as the water droplets removed by operations of the spinner plates 234 and coalescing unit 235 can fall to the bottom of the tank and be recirculated. A float valve 242 at the bottom of the tank 231 operating in combination with a low water level switch 243 at the reservoir 246 can provide for maintaining an adequate water supply for the pump 241.

Diagram 300 depicts an embodiment for applying humid ozonated air to foodstuffs such as produce. Products 308 such as produce can be conveyed as a continuous process through a treatment enclosure 301. Some example products that can be effectively treated by such an embodiment can comprise berries, fruit, dried fruit, citrus, kiwi fruit, nuts and other products that cannot be exposed to water.

Products 308 to be treated can be placed on a conveyor 309 that passes through the treatment enclosure 301. As the products 308 are conveyed through the enclosure 301, they can be exposed to high humidity ozone gas such as the humid ozonated air 224 output depicted and described in diagrams 200 and 250. Humid ozonated air 224 can be injected into the enclosure 301 by a plurality of nozzles 304 306 located throughout the treatment chamber. The nozzles 304 306 can be directed at the products 308. As humid ozonated air 305 307 as a compressed gas exits the nozzles 304 306 it can create turbulence within the enclosure and on the surfaces of the products. Such turbulence can advantageously improve the searching effect of the humid ozonated air 224 to reach irregular surfaces, cavities, and crevices found on foodstuffs.

Figure 3A:
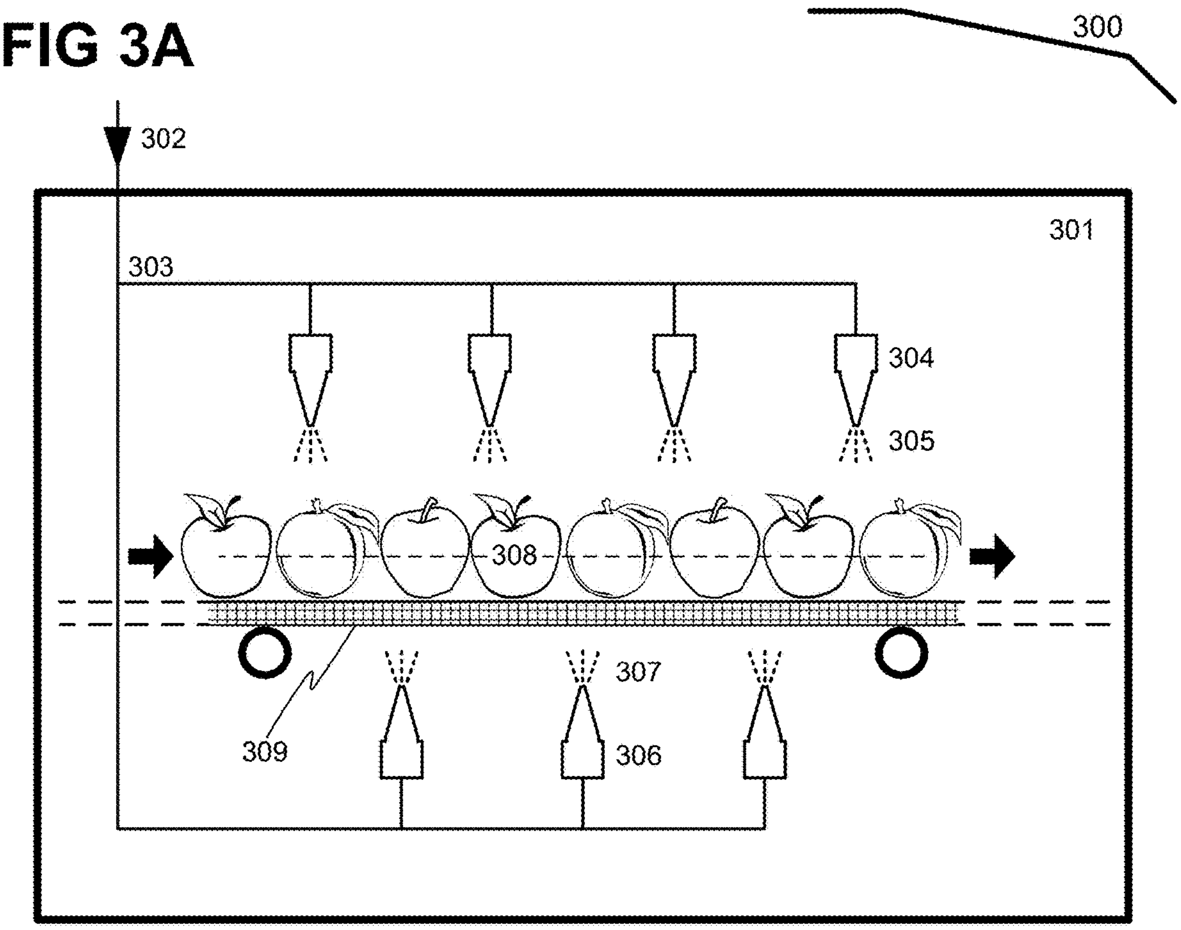
FIG. 3A depicts an embodiment for applying humid ozonated air to produce.
Figure 3B:
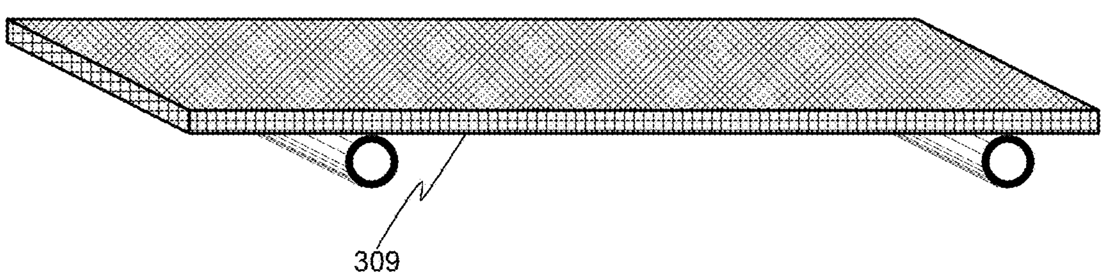
FIG. 3B depicts a conveyor for conveying produce.
Figure 4:
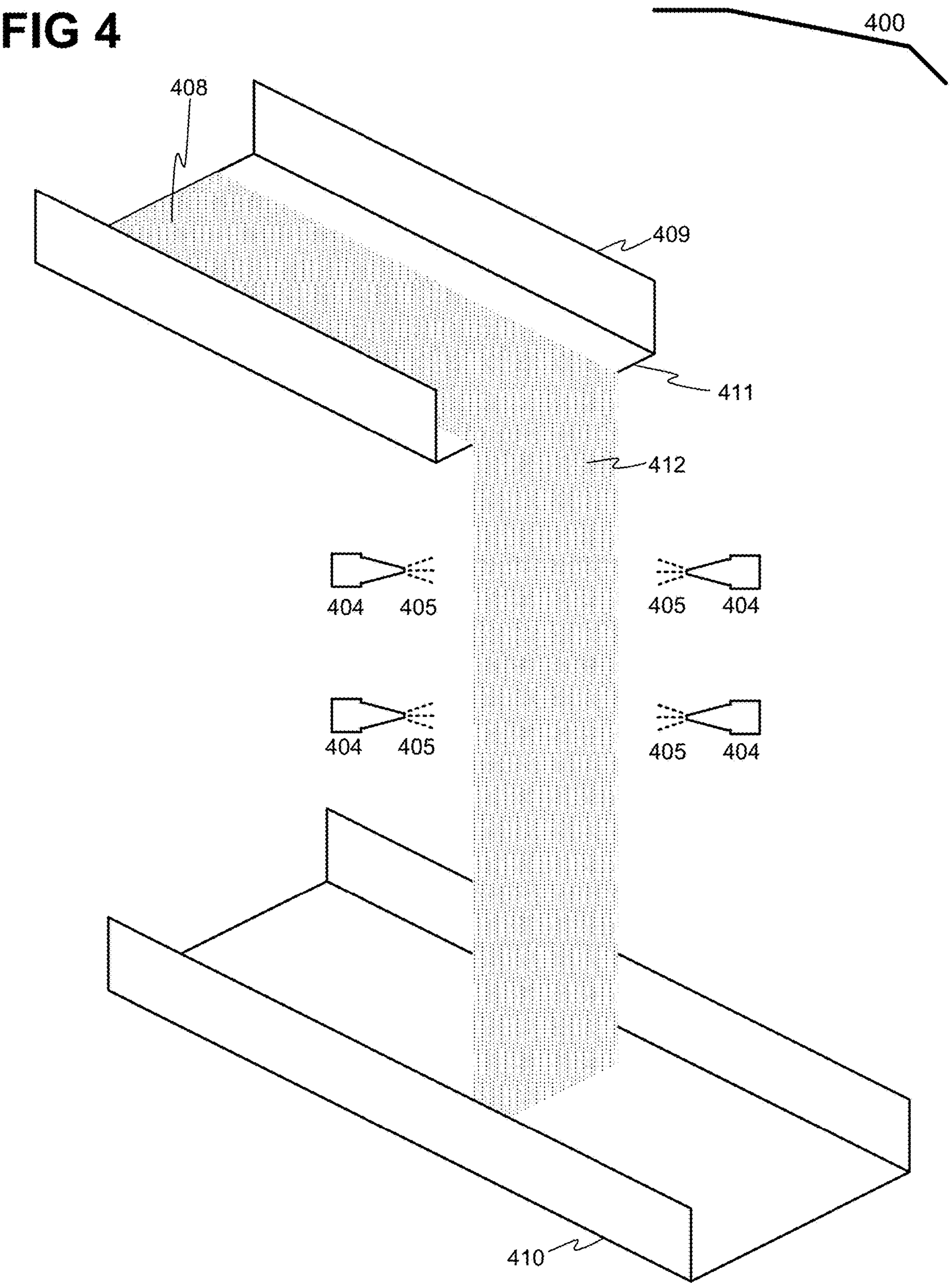
FIG. 4 depicts an embodiment for applying humid ozonated air to foodstuffs.
Figure 5:
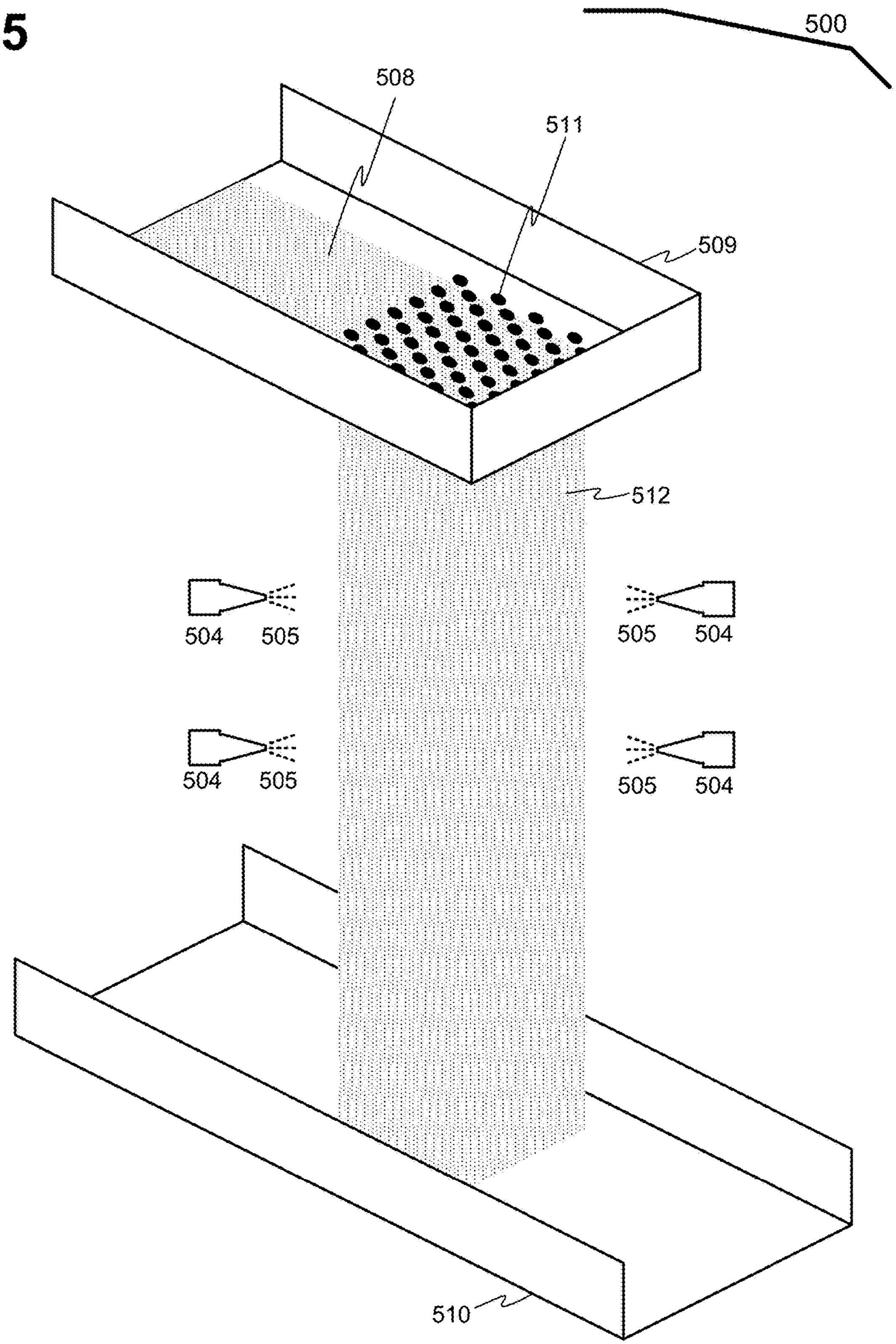
FIG. 5 depicts an embodiment for applying humid ozonated air to foodstuffs.

A supply of humid ozonated air 302 can be provided to treatment enclosure 301. Within the enclosure 301, humid ozonated air 302 can be supplied to the plurality of nozzles 304 306 by plumbing 303. Notably in some embodiments, nozzles 306 can be located beneath a conveyor 309 can direct gas 307 through the conveyor at the supporting side of products resting on the conveyor. Exposure to gas from nozzles at these additional angles below the conveyor can provide for more effective treatment than without such. In some embodiments a conveyor surface can be substantially open to gas passing through the surface yet still provide adequate support for particular products. Some typical surface constructions can comprise perforated, mesh, and/or grid. In some typical embodiments, the conveyor 309 can be a stainless steel wire conveyor. Products can be supported by a stainless steel grid or mesh yet the surface does not effectively block exposure to gas emanating from below the conveyor. FIG. 3B depicts such a stainless steel wire conveyor 309.

Diagram 400 depicts an embodiment for applying humid ozonated air to foodstuffs.

Foodstuffs 408 can be conveyed on a vibrating sloped channel 409 having a terminal edge 411. The action of the vibrating sloped channel 409 can convey the foodstuffs 408 beyond the terminal edge 411 thereby providing a cascade 412 of the foodstuffs as the foodstuffs fall. High humidity ozone gas such as the humid ozonated air 224 output depicted and described in diagrams 200 and 250 can be applied by nozzles 404 to the cascade 412. One or more nozzles 404 can be located at various positions in and/or near the cascade 412 so as to direct the humid ozonated air 405 at the cascade 412 of foodstuffs. A variety of foodstuffs and/or other products can be provided antimicrobial treatment in this manner, such as by way of example and not limitation, dry powders, flakes, and seeds. The cascade 412 can terminate in another channel or container 410 and be subject to further processing.

In some embodiments the foodstuffs and/or other products can be further treated by passing through additional stages of the depicted embodiment 400. That is, the foodstuffs and/or other products can be treated by a series of vibrating sloped channel conveyances that can each provide an additional cascade at which additional nozzles direct humid ozonated air at the additional cascade, thus providing additional antimicrobial treatment. In some embodiments, the foodstuffs and/or other products can be recirculated through one or more of the stages. As the foodstuffs and/or other products experience multiple and/or repeated stages, an effective cumulative duration of exposure to the humid ozonated air can be accumulated that can be much greater than that of a single stage. Thus accumulated treatment durations can be built up to be within a range for some typical embodiments of 30 to 120 seconds.

One or more stages of the depicted embodiment 400 can be applied within a treatment enclosure. Such a treatment enclosure 105 301 can be as depicted and described in relation to diagram 100 and/or diagram 300. In some embodiments, the elements depicted in diagram 400 can be enclosed, and vent exhausts can be provided to collect excess ozone and direct it to a disposal system that prevents and/or minimizes undesirable ozone exposure to people.

Diagram 500 depicts an embodiment for applying humid ozonated air to foodstuffs.

Products such as foodstuffs 508 can be conveyed by a variety of means 509 to a seive 511 such as a sifter. In some embodiments, conveyance to the seive 511 can be provided by a translating belt, a vibrating sloped channel, and/or any other known and/or convenient form of suitable conveyance. A seiving action such as sifting can be applied to the products 508 thereby providing a cascade 512 of the seived products as the products fall. In some embodiments, sifting can be provided by perforations in a vibrating sloped channel. Such a vibrating sloped channel can be as depicted and described in relation to diagram 400 herein. Seiving such as sifting can select for item and/or particle sizes to be smaller than a specific maximum size, thus providing relatively more surface area per item and/or particle. In some embodiments a vibrating sifter can break down clumps and/or other accumulations of product into smaller pieces that can make their way through the sifter.

High humidity ozone gas such as the humid ozonated air 224 output depicted and described in diagrams 200 and 250 can be applied by nozzles 504 to the cascade 512. One or more nozzles 504 can be located at various positions in and/or near the cascade 512 so as to direct the humid ozonated air 505 at the cascade 512 of foodstuffs. A variety of foodstuffs and/or other products can be provided antimicrobial treatment in this manner, such as by way of example and not limitation, dry powders, flakes, and seeds. The cascade 512 can terminate in another channel or container 510 and be subject to further processing.

In some embodiments the foodstuffs and/or other products can be further treated by passing through additional stages of the depicted embodiment 500 and/or other treatment embodiments, such as those depicted and described with relation to diagram 400. Thus additional antimicrobial treatment can be provided. In some embodiments, the foodstuffs and/or other products can be recirculated through one or more of the stages. As the foodstuffs and/or other products experience multiple and/or repeated stages, an effective cumulative duration of exposure to the humid ozonated air can be accumulated that can be much greater than that of a single stage. Thus accumulated treatment durations can be built up to be within a range for some typical embodiments of 30 to 120 seconds.

One or more stages of the depicted embodiment 500 can be applied within a treatment enclosure. Such a treatment enclosure 105 301 can be as depicted and described in relation to diagram 100 and/or diagram 300. In some embodiments, the elements depicted in diagram 500 can be enclosed, and vent exhausts can be provided to collect excess ozone and direct it to a disposal system that prevents and/or minimizes undesirable ozone exposure to people.

Figure 6:
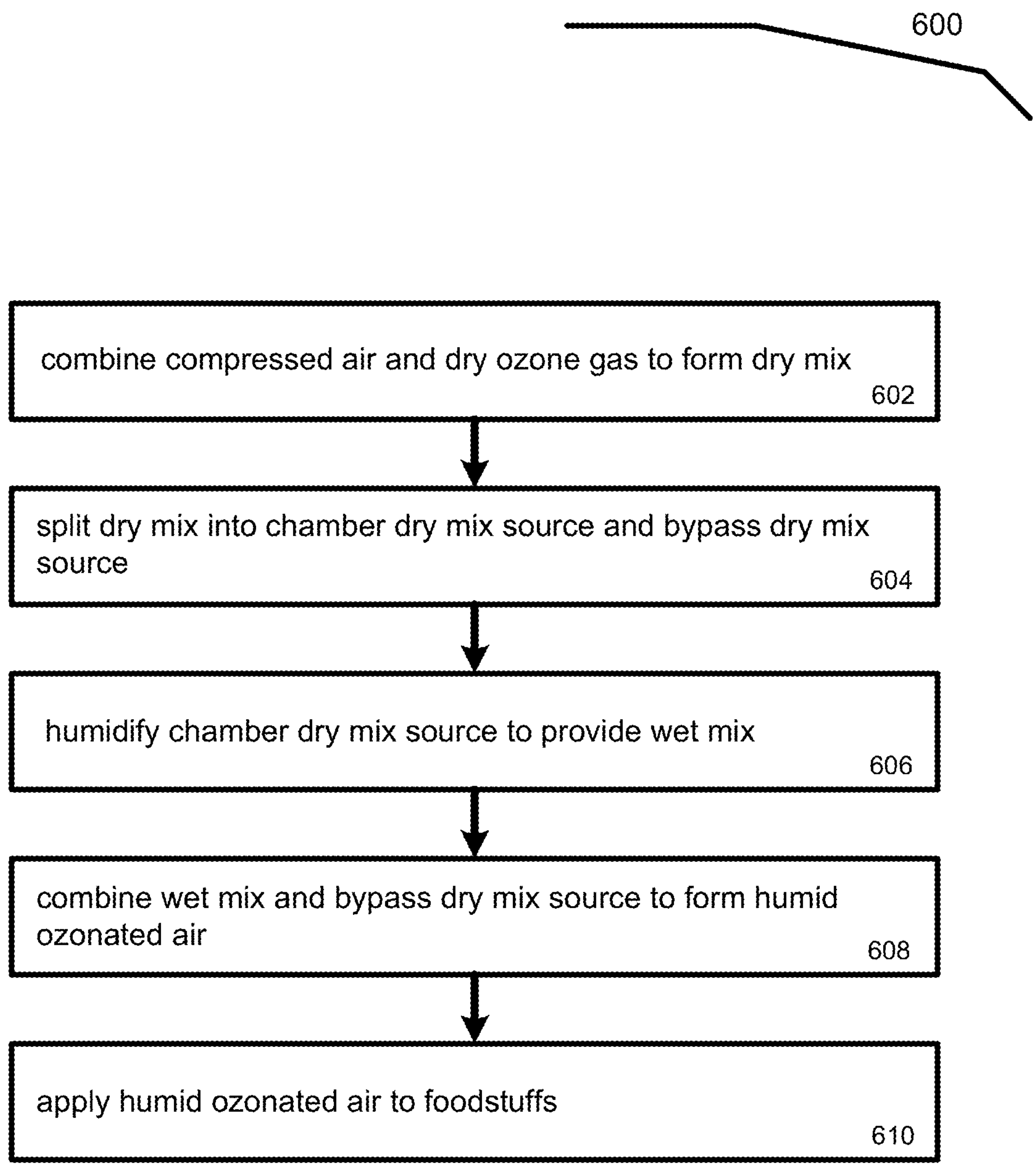
FIG. 6 depicts a method for high humidity ozone gas treatment.

Diagram 600 of FIG. 6 depicts steps of a method for high humidity ozone gas treatment.

In step 602, compressed air and dry ozone gas can be combined to form a dry mix of gases. In diagram 250 dry ozone gas 215 can be provided by ozone generator 213. Compressed air 205 can be provided by compressor 203. The gases can be combined by input junction 207, thereby providing the dry mix 218 of gases. In some embodiments, an ozone monitor 217 can provide an ozone level measurement of the dry mix 218, and the ozone generator 213 can provide an ozone gas amount and/or rate in response to the ozone level measurement.

In step 604, the dry mix can be split into a chamber dry mix source and a bypass dry mix source. In diagram 250 blending valve 221 can receive the dry mix 218 and split it into chamber dry mix source 222 and bypass dry mix source 226. In some embodiments, a humidity monitor 223 can provide a humidity level measurement of humid ozonated air 224. Blending valve 221 can control the absolute and/or relative amounts of the chamber dry mix source 222 and the bypass dry mix source 226 responsive to the humidity level measurement, thereby providing adjustment of the humidity in the humid ozonated air 224 provided by output junction 227.

In step 606, the chamber dry mix source can be humidified, providing a wet mix of gases. In diagram 250, a humidifying chamber 231 can receive and process the chamber dry mix source 222 and water 244, thereby producing a gaseous wet mix 236. In some embodiments, chamber dry mix source 222 can enter the chamber 231 near the bottom of the chamber. One or more misting nozzles 232 can deliver water mist 233 into chamber 231. The water mist 233 can vaporize within the chamber 231, thereby increasing the humidity of gas within the chamber. The humidified gas exiting the chamber can provide the wet mix 236. Water droplets can be present in the volume of the chamber 231. These droplets can result from incomplete vaporization of the water mist 233. A plurality of spinner plates 234 can provide a cycloning action that can remove water droplets from the volume of the chamber. Coalescing unit 235 can provide a coalescing process that can remove water droplets from the volume of the chamber.

In step 608, the wet mix and bypass dry mix source can be combined to form humid ozonated air. In diagram 250, wet mix 236 and bypass dry mix source 227 can be combined by output junction 227, thereby providing humid ozonated air 224.

In step 610, humid ozonated air can be applied to foodstuffs, thereby providing an antimicrobial treatment. Diagram 300 depicts an embodiment in which produce 308 can be conveyed on a wire conveyor 309 and humid ozonated air 305 307 can be applied by nozzles 304 306 as the produce is conveyed. Diagram 400 depicts an embodiment in which produce 408 can be conveyed on a vibrating sloped channel 409 until it cascades off of a terminal edge 411. Humid ozonated air 405 can be applied by nozzles 404 to the cascade 412. Diagram 500 depicts an embodiment in which produce 508 can be seived, providing a cascade 512 of seived produce. Humid ozonated air 505 can be applied by nozzles 504 to the cascade 512.

Figure 7:
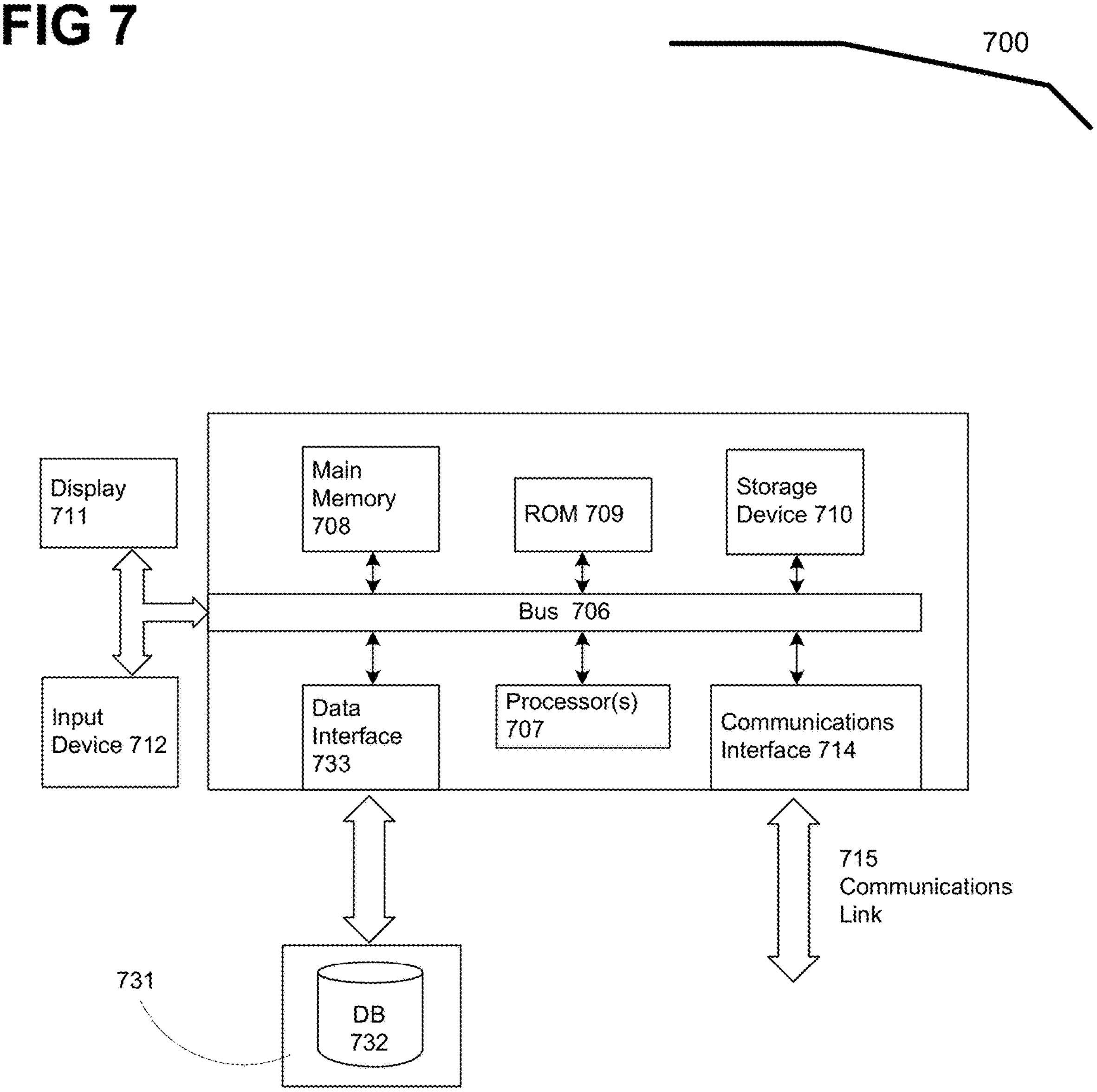
FIG. 7 depicts a computer system.

The execution of the sequences of instructions required to practice the embodiments can be performed by a computer system 700 as shown in FIG. 7. In an embodiment, execution of the sequences of instructions is performed by a single computer system 700. According to other embodiments, two or more computer systems 700 coupled by a communication link 717 can perform the sequence of instructions in coordination with one another. Although a description of only one computer system 700 will be presented below, however, it should be understood that any number of computer systems 700 can be employed to practice the embodiments.

A computer system 700 according to an embodiment will now be described with reference to FIG. 7, which is a block diagram of the functional components of a computer system 700. As used herein, the term computer system 700 is broadly used to describe any computing device that can store and independently run one or more programs.

Each computer system 700 can include a communication interface 714 coupled to the bus 706. The communication interface 714 provides two-way communication between computer systems 700. The communication interface 714 of a respective computer system 700 transmits and receives electrical, electromagnetic or optical signals, that include data streams representing various types of signal information, e.g., instructions, messages and data. A communication link 717 links one computer system 700 with another computer system 700. For example, the communication link 715 can be a LAN, in which case the communication interface 714 can be a LAN card, or the communication link 715 can be a PSTN, in which case the communication interface 714 can be an integrated services digital network (ISDN) card or a modem, or the communication link 715 can be the Internet, in which case the communication interface 714 can be a dial-up, cable or wireless modem.

A computer system 700 can transmit and receive messages, data, and instructions, including program, i.e., application, code, through its respective communication link 715 and communication interface 714. Received program code can be executed by the respective processor(s) 707 as it is received, and/or stored in the storage device 710, or other associated non-volatile media, for later execution.

In an embodiment, the computer system 700 operates in conjunction with a data storage system 731, e.g., a data storage system 731 that contains a database 732 that is readily accessible by the computer system 700. The computer system 700 communicates with the data storage system 731 through a data interface 733. A data interface 733, which is coupled to the bus 706, transmits and receives electrical, electromagnetic or optical signals, that include data streams representing various types of signal information, e.g., instructions, messages and data. In embodiments, the functions of the data interface 733 can be performed by the communication interface 714.

Computer system 700 includes a bus 706 or other communication mechanism for communicating instructions, messages and data, collectively, information, and one or more processors 707 coupled with the bus 706 for processing information. Computer system 700 also includes a main memory 708, such as a random access memory (RANI) or other dynamic storage device, coupled to the bus 706 for storing dynamic data and instructions to be executed by the processor(s) 707. The main memory 708 also can be used for storing temporary data, i.e., variables, or other intermediate information during execution of instructions by the processor(s) 707.

The computer system 700 can further include a read only memory (ROM) 709 or other static storage device coupled to the bus 706 for storing static data and instructions for the processor(s) 707. A storage device 710, such as a magnetic disk or optical disk, can also be provided and coupled to the bus 706 for storing data and instructions for the processor(s) 707.

A computer system 700 can be coupled via the bus 706 to a display device 711, such as, but not limited to, a cathode ray tube (CRT) or a liquid-crystal display (LCD) monitor, for displaying information to a user. An input device 712, e.g., alphanumeric and other keys, is coupled to the bus 706 for communicating information and command selections to the processor(s) 707.

According to one embodiment, an individual computer system 700 performs specific operations by their respective processor(s) 707 executing one or more sequences of one or more instructions contained in the main memory 708. Such instructions can be read into the main memory 708 from another computer-usable medium, such as the ROM 709 or the storage device 710. Execution of the sequences of instructions contained in the main memory 708 causes the processor(s) 707 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 707. Such a medium can take many forms, including, but not limited to, non-volatile, volatile and transmission media. Non-volatile media, i.e., media that can retain information in the absence of power, includes the ROM 709, CD ROM, magnetic tape, and magnetic discs. Volatile media, i.e., media that can not retain information in the absence of power, includes the main memory 708. Transmission media includes coaxial cables, copper wire and fiber optics, including the wires that comprise the bus 706. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Although exemplary embodiments of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

For example, the configuration and arrangement of the system can be modified. The scope of the invention should, therefore, be determined not with reference to the above description, but instead should be determined with reference to the appended claims along with their full scope of equivalents.

The invention claimed is:

1. A method comprising the steps of:

combining compressed air and dry ozone gas, thereby forming a dry mix;

splitting the dry mix, thereby forming a chamber dry mix source and a bypass dry mix source;

humidifying the chamber dry mix source, thereby providing a wet mix;

combining the wet mix and the bypass dry mix source, thereby forming humid ozonated air; and, applying the humid ozonated air to produce, thereby providing an antimicrobial treatment to the produce.

2. The method of claim 1 further comprising the steps of:

providing a chamber;

receiving the chamber dry mix source into the chamber;

misting water within the chamber;

removing excess water from the chamber by cycloning;

removing excess water from the chamber by coalescing; and, providing the wet mix from the chamber.

3. The method of claim 1 further comprising the steps of:

providing an ozone generator configured to generate ozone gas;

monitoring ozone concentration of the dry mix, thereby providing an ozone level measurement; and, generating the dry ozone gas responsive to the ozone level measurement.

4. The method of claim 1 further comprising the steps of:

monitoring humidity level of the humid ozonated air, thereby providing a humidity measurement;

providing a blending valve, configured to selectively split the dry mix into the chamber dry mix source and the bypass dry mix source; and, selectively splitting the dry mix into the chamber dry mix source and the bypass dry mix source, responsive to the humidity measurement.

5. The method of claim 1 further comprising the steps of:

conveying the produce on a wire conveyor;

wherein the humid ozonated air is applied by nozzles to the produce as the produce is conveyed.

6. The method of claim 1 further comprising the steps of:

providing a vibrating sloped channel comprising a terminal edge; and, conveying the produce on the vibrating sloped channel past the terminal edge, thereby providing a cascade of produce;

wherein the humid ozonated air is applied by nozzles to the cascade of produce.

7. The method of claim 1 further comprising the steps of:

seiving the produce, thereby providing a cascade of produce;

wherein the humid ozonated air is applied by nozzles to the cascade of produce.

* * * * *